United States Patent
Shalom et al.

(10) Patent No.: US 10,216,666 B2
(45) Date of Patent: Feb. 26, 2019

(54) CACHING METHODS AND SYSTEMS USING A NETWORK INTERFACE CARD

(71) Applicant: QLOGIC Corporation, Aliso Viejo, CA (US)

(72) Inventors: Rafi Shalom, Petah Tikva (IL); Nir Goren, Herut (IL)

(73) Assignee: Cavium, LLC, Santa Clara, CA (US)

( * ) Notice: Subject to any disclaimer, the term of this patent is extended or adjusted under 35 U.S.C. 154(b) by 405 days.

(21) Appl. No.: 14/830,045

(22) Filed: Aug. 19, 2015

(65) Prior Publication Data

US 2016/0127493 A1 May 5, 2016

Related U.S. Application Data

(60) Provisional application No. 62/075,158, filed on Nov. 4, 2014.

(51) Int. Cl.
| | |
|---|---|
| *G06F 15/167* | (2006.01) |
| *G06F 13/32* | (2006.01) |
| *G06F 12/1081* | (2016.01) |
| *H04L 29/08* | (2006.01) |
| *G06F 13/12* | (2006.01) |
| *G06F 3/06* | (2006.01) |
| *G06F 13/28* | (2006.01) |

(52) U.S. Cl.
CPC .............. *G06F 13/32* (2013.01); *G06F 3/067* (2013.01); *G06F 3/0619* (2013.01); *G06F 3/0679* (2013.01); *G06F 12/1081* (2013.01); *G06F 13/128* (2013.01); *G06F 13/28* (2013.01); *H04L 67/1097* (2013.01); *H04L 67/2842* (2013.01); *G06F 2206/1014* (2013.01); *G06F 2212/2532* (2013.01); *Y02D 10/14* (2018.01)

(58) Field of Classification Search
CPC ......... G06F 13/32; G06F 3/0619; G06F 3/067
USPC ............................................ 709/213
See application file for complete search history.

(56) References Cited

U.S. PATENT DOCUMENTS

| | | | |
|---|---|---|---|
| 5,978,951 A | * 11/1999 | Lawler | ........... H03M 13/09 370/392 |
| 7,152,122 B2 | 12/2006 | Kagan et al. | |
| 7,688,838 B1 | 3/2010 | Aloni et al. | |
| (Continued) | | | |

FOREIGN PATENT DOCUMENTS

WO  WO-2005/093588   10/2005

OTHER PUBLICATIONS

"International Search Report from ISA/KR dated Jan. 12, 2016 for International Application No. PCT/US2015/051497".
"Written Opinion from ISA/KR dated Jan. 12, 2016 for International Application No. PCT/US2015/051497".
Matthews, Shane "NVM Express: SCSI Translation Reference", NVM Express Workgroup,1-54.
"International Search Report from ISA/KR dated Dec. 16, 2015 for International Application No. PCT/US2015/051513".
"Written Opinion from ISA/KR dated Dec. 16, 2015 for International Application No. PCT/US2015/051513".

(Continued)

*Primary Examiner* — Vivek Srivastava
*Assistant Examiner* — Atta Khan
(74) *Attorney, Agent, or Firm* — Klein, O'Neill & Singh, LLP

(57) ABSTRACT

A computing device having a host memory and a host processor for executing instructions out of the host memory; and a network interface card interfacing with the computing device are provided. When there is a cache hit for a read request, the network interface card processes the read request by obtaining data stored from one or both of the host memory and a storage device that the network interface card accesses without involving the host processor and when there are is a cache miss, then the read request is processed by the host processor.

18 Claims, 9 Drawing Sheets

(56) References Cited

U.S. PATENT DOCUMENTS

| | | | |
|---|---|---|---|
| 2002/0091844 A1* | 7/2002 | Craft | G06F 5/10 |
| | | | 709/230 |
| 2005/0144223 A1* | 6/2005 | Yang | G06F 12/0866 |
| | | | 709/203 |
| 2005/0193164 A1* | 9/2005 | Royer, Jr. | B82Y 10/00 |
| | | | 711/113 |
| 2005/0198410 A1 | 9/2005 | Kagan et al. | |
| 2010/0332612 A1 | 12/2010 | Johnsen et al. | |
| 2011/0246597 A1 | 10/2011 | Swanson et al. | |
| 2011/0276746 A1 | 11/2011 | Pruthi et al. | |
| 2013/0198312 A1 | 8/2013 | Tamir et al. | |
| 2014/0019808 A1 | 1/2014 | Alanis et al. | |
| 2014/0032696 A1 | 1/2014 | Pinkerton et al. | |
| 2014/0122634 A1* | 5/2014 | Conner | G06F 13/4027 |
| | | | 709/212 |
| 2014/0180665 A1 | 6/2014 | Naydon et al. | |
| 2015/0254088 A1 | 9/2015 | Chou et al. | |

OTHER PUBLICATIONS

"Office Action from USPTO dated Mar. 6, 2017 for U.S. Appl. No. 14/667,485".
"Final Office Action from USPTO dated Jul. 24, 2017 for U.S. Appl. No. 14/667,485".
"International Preliminary Report on Patentability from the International Bureau of WIPO dated May 18, 2017 for PCT Application No. PCT/US2015/051497".
"International Preliminary Report on Patentability from the International Bureau of WIPO dated May 18, 2017 for PCT Application No. PCT/US2015/051513".

* cited by examiner

| Underflow 202 | ID 204 | Reserved 206 | Add 208 | Remove 210 | Valid 212 | Overflow 214 | Usage Counter 216 |

200

300

CACHING METHODS AND SYSTEMS USING A NETWORK INTERFACE CARD

CROSS-REFERENCE TO RELATED APPLICATIONS

This patent application claims priority of U.S. Provisional Patent Application Ser. No. 62/075,158 filed on Nov. 4, 2014, the disclosure of which is incorporated herein by reference in its entirety.

TECHNICAL FIELD

The present disclosure relates to storage systems and, more particularly, to accessing a storage device of a computing system via a network interface card (NIC).

BACKGROUND

Computing devices (or systems) use mass storage devices to store data. Different storage options are available for computing devices to store data and retrieve data, for example, direct-attached storage (DAS), network attached storage (NAS), and storage area networks (SANs). A DAS system typically includes a plurality of storage drives/devices that are directly attached to a computing device (for example, a server) Common protocols used for DAS storage devices are SCSI (Small Computer Systems Interface), ATA (AT attachment), SATA (Serial ATA), SAS (Serial Attached SCSI), NVMe (Non-Volatile Memory Host Controller Interface Specification), and others.

In conventional target systems, for processing input/output (I/O) requests, a network packet is received by a network interface card (NIC or a host bus adapter (HBA)) of a target and then delivered to a central processing unit (CPU) of the target system for processing. When the I/O request is to read data, then the requested data may be stored at a local cache of the target system. Continuous efforts are being made to improve caching performance.

SUMMARY

The present aspects have several features, no single one of which is solely responsible for their desirable attributes. Without limiting the scope of the present aspects as expressed by the claims that follow, their more prominent features now will be discussed briefly. After considering this discussion, and particularly after reading the section entitled "Detailed Description," one will understand how the features of the present aspects provide the advantages described herein.

In one aspect, a machine implemented method is provided. The method includes maintaining a cache entry data structure for storing a sync word associated with a cache entry that points to a storage location at a host memory or a storage device external to the host memory; where the sync word is associated with a plurality of states that are used by a network interface card (NIC) and a caching module of a computing device coupled to the NIC for processing input/output requests; using the cache entry data structure by the NIC to determine that there is a cache hit, in response to a read request received by the NIC; retrieving data from the host memory by the NIC, when data for the read request is stored at the host memory location; communicating by the NIC with the storage device to retrieve data for the read request, when the data is cached at the storage device; and placing the data for the read request for the NIC by the storage device at the host memory, when the data is cached by the storage device.

In another aspect, a system is provided. The system includes a computing device having a host memory and a host processor for executing instructions out of the host memory; and a NIC interfacing with the computing device. When there is a cache hit for a read request, the network interface card processes the read request by obtaining data stored from one or both of the host memory and a storage device that the network interface card accesses without involving the host processor and when there are is a cache miss, then the read request is processed by the host processor.

In yet another aspect, a non-transitory, machine readable storage medium having stored thereon instructions for performing a method is provided. The storage medium includes machine executable code which when executed by at least one machine, causes the machine to: maintain a cache entry data structure for storing a sync word associated with a cache entry that points to a storage location at a host memory or a storage device external to the host memory; where the sync word is associated with a plurality of states that are used by a NIC and a caching module of a computing device coupled to the NIC for processing input/output requests; use the cache entry data structure by the NIC to determine that there is a cache hit, in response to a read request received by the NIC; retrieve data from the host memory by the NIC, when data for the read request is stored at the host memory location; communicate by the NIC with the storage device to retrieve data for the read request, when the data is cached at the storage device; and place the data for the read request for the NIC by the storage device at the host memory, when the data is cached by the storage device.

This brief summary has been provided so that the nature of the present disclosure may be understood quickly. A more complete understanding of the present disclosure can be obtained by reference to the following detailed description of the various aspects thereof concerning the attached drawing

BRIEF DESCRIPTION OF DRAWINGS

The various aspects of the present disclosure will now be discussed in detail below. These novel and non-obvious aspects are depicted in the accompanying drawings, which are for illustrative purposes only. These drawings include the following figures, in which like numerals indicate like parts.

DETAILED DESCRIPTION

Figure 1A:
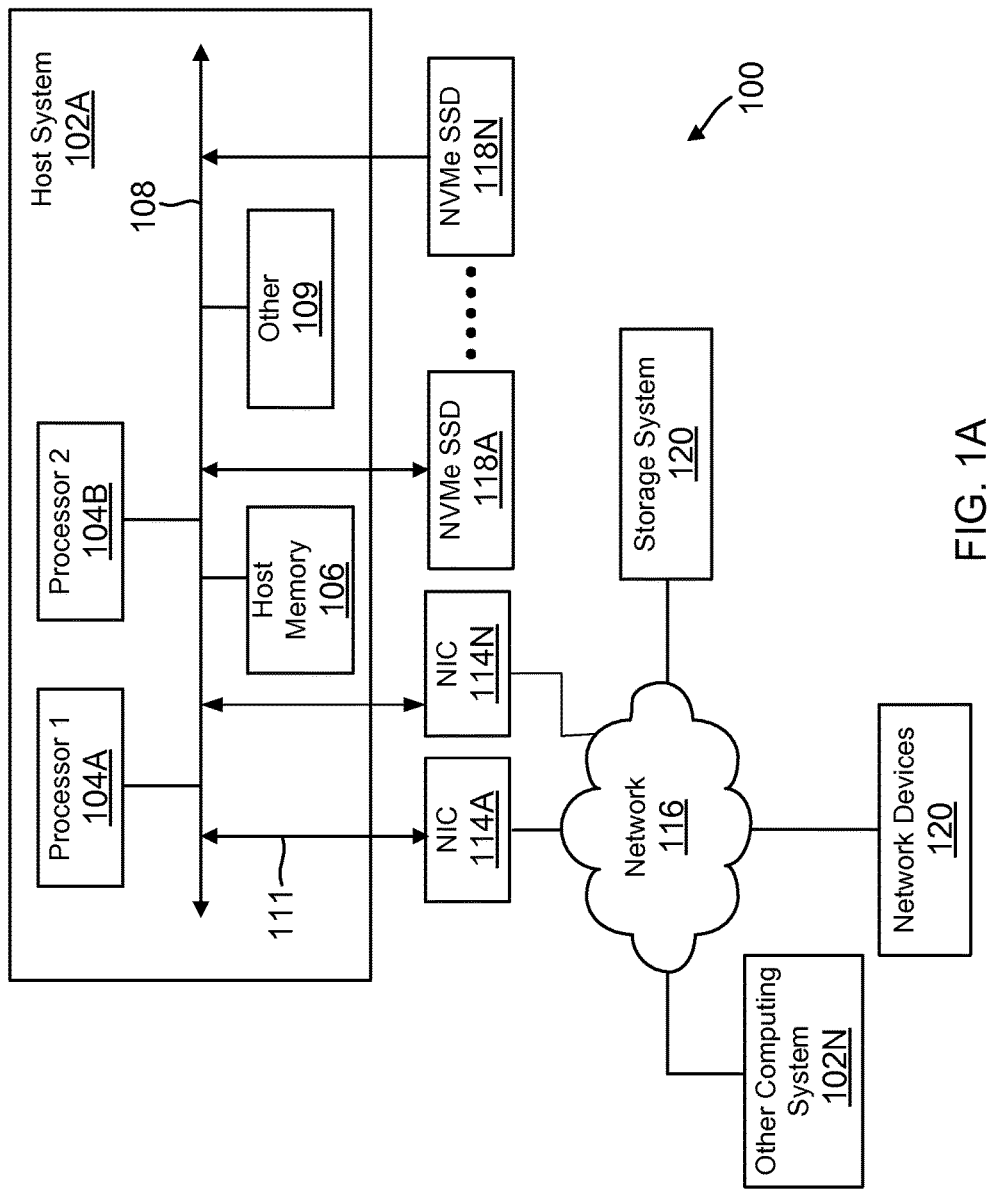
FIG. 1A is a functional block diagram of a system, according to one aspect of the present disclosure.

The following detailed description describes the present aspects with reference to the drawings. In the drawings, reference numbers label elements of the present aspects. These reference numbers are reproduced below in connection with the discussion of the corresponding drawing features.

As a preliminary note, any of the aspects described with reference to the figures may be implemented using software, firmware, hardware (e.g., fixed logic circuitry), or a combination of these implementations. The terms "logic," "module," "component," "system," and "functionality," as used herein, generally represent software, firmware, hardware, or a combination of these elements. For instance, in the case of a software implementation, the terms "logic," "module," "component," "layer," "system," and "functionality" represent executable instructions that perform specified tasks when executed on a hardware-based processing device or devices (e.g., CPU or CPUs). The program code can be stored in one or more non-transitory, computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of medium for retaining information in any form, including various kinds of storage devices (magnetic, optical, static, etc.).

The aspects disclosed herein may be implemented as a computer process (method), a computing system, or as an article of manufacture, such as a computer program product or computer-readable media. The computer program product may be non-transitory, computer storage media, readable by a computer device, and encoding a computer program of instructions for executing a computer process. The computer program product may also be readable by a computing system, and encoding a computer program of instructions for executing a computer process.

In one aspect, as described below in detail, a computing device having a host memory and a host processor for executing instructions out of the host memory; and a network interface card interfacing with the computing device is provided. When there is a cache hit for a read request, the network interface card processes the read request by obtaining data stored from one or both of the host memory and a storage device that the network interface card accesses without involving the host processor and when there is is a cache miss, then the read request is processed by the host processor.

System 100: FIG. 1A is a block diagram of a system 100 configured for use with the various aspects of the present disclosure. System 100 may include a plurality of computing systems 102A-102N (may also be referred to as server(s) 102 or host system(s) 102), used according to one aspect of the present disclosure. The computing system 102A may include one or more processors 104A-104B (referred to as processor 104 or processors 104), also known as central processing units (CPUs) or processor cores. Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. Processor 104 executes machine-implemented instructions (or process steps/blocks) out of a memory 106 that interfaces with an interconnect 108 (may be referred to as a computer bus 108). The computer bus 108 may be, for example, a system bus, a Peripheral Component Interconnect (PCI) bus, a PCI-Express (PCIe) bus, a Hyper-Transport or industry standard architecture (ISA) bus, a SCSI bus, a universal serial bus (USB), an Institute of Electrical and Electronics Engineers (IEEE) standard 1394 bus (sometimes referred to as "Firewire"), or any other type of bus, including a memory bus that enables connecting a memory to a memory controller in computer systems.

The host system 102A may further have access to one or more storage devices 118A-118N (may be referred to as storage 118), which may include, for example, a non-volatile memory solid state storage device (referred to herein as an example, NVMe SSD 118), a hard disk (HDD) or any other storage device type (for example, a hybrid drive, a hard drive and others) for storing structured or unstructured data. NVMe is an industry standard that enables connection to a SSD coupled by a PCI-Express link. Storage 118 may store data containers, for example, files, structured and unstructured data, as described below in detail.

Memory 106 also interfaces with the computer bus 108 to provide the processor 104 with access to memory storage. Memory 106 may include random access memory (RAM). When executing stored computer-executable process steps from storage 108, the processor 104 may store and execute the process steps out of memory 106. Read only memory (ROM, not shown) may also be used to store invariant instruction sequences, such as startup instruction sequences or basic input/output system (BIOS) sequences for operation of a keyboard (not shown). Memory 106 may also be used by processor 104 to cache data, as described below. Memory 106 may also be used to store a plurality of queues used by other devices to communicate, as described below in detail.

The host system 102A also includes other devices and interfaces 109, which may include a display device interface, a keyboard interface, a pointing device interface, and others. The details of these components are not germane to the inventive aspects disclosed herein.

Various network and storage protocols may be used by host system 102A/NIC 114 to handle network and storage traffic, for example, Ethernet, Fibre Channel, Fibre Channel over Ethernet (FCoE), Internet over Small Computer System Interface (iSCSI), Remote Direct Memory Access (RDMA) and others. Some of these common protocols are described below.

Ethernet IEEE 802.3 is a common network protocol used for network communication. The original Ethernet bus or star topology was developed for local area networks (LAN) to transfer data at 10 Mbps (megabits per second). Newer Ethernet standards (for example, Fast Ethernet (100 Base-T)

and Gigabit Ethernet) support data transfer rates that are greater than 1 gigabit (Gb). The various aspects described herein may use Ethernet (which includes 10 G (gigabits per second), 25 G, 50 G, 100 G or any other operating rates of the network protocol. However, the adaptive aspects disclosed herein are not limited to any particular protocol, as long as the functional goals are met by an existing or new network protocol.

Fibre Channel (may also be referred to as "FC") is a common storage technology used in SANs. Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

Fibre Channel over Ethernet (FCoE) has been developed to handle both Ethernet and Fibre Channel traffic in a storage area network (SAN). This functionality would allow Fibre Channel to leverage high speed, for example, 10 Gigabit Ethernet networks while preserving the Fibre Channel protocol.

iSCSI is an IP-based storage networking standard for linking data storage facilities. By carrying SCSI commands over IP networks, iSCSI is used to facilitate data transfers over intranets and to manage storage over long distances. iSCSI can be used to transmit data over local area networks (LANs), wide area networks (WANs), or the Internet and can enable location-independent data storage and retrieval. The protocol allows clients to send SCSI commands (referred to as command or (control) data blocks (CDBs) to SCSI storage devices (may be referred to as targets) on remote servers. iSCSI is a SAN-based protocol, allowing organizations to consolidate storage into data center storage arrays while providing hosts (such as database and web servers) with the illusion of locally attached disks. Unlike traditional Fibre Channel, which uses special-purpose cabling, iSCSI can be run over long distances using existing network infrastructure.

In one aspect, computing system 102A uses one or more network interface cards (NICs) 114A-114N (referred to as NIC 114 or NICs 114) to communicate with other devices and systems, for example, network devices 120 and storage system 120 via a network 116. Network 116 may be the Internet, a local area network, a wireless network or any other network type. NIC 114 may also be used to communicate with storage 118 via a PCI-Express link 111, as described below in detail.

Figure 1B:
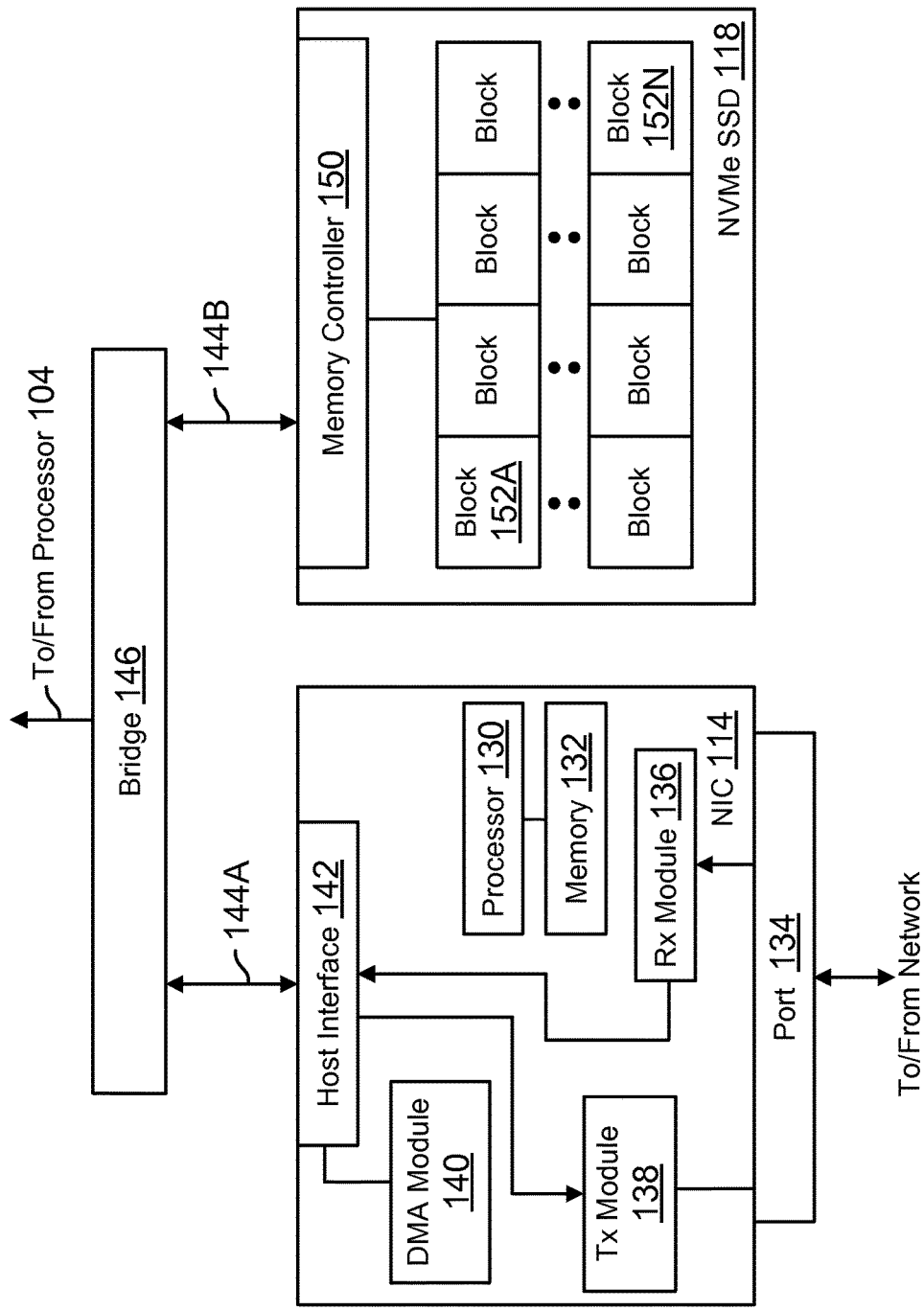
FIG. 1B shows a block diagram of a NIC (network interface card) and a storage device, according to one aspect.

FIG. 1B shows an architectural block diagram of NIC 114 communicating with the storage device 118, according to one aspect of the present disclosure. A PCI-Express bridge 146 may be used to connect to NIC 114 and storage 118 via links 144A/144B. The bridge 146 may be connected to computer bus 108. NIC 114 includes a host interface 142 for sending information to host memory 106 and receiving information from host memory 106. A direct memory access (DMA) module 140 is used to receive data from host memory 106 and send data for host memory 106 queues. NIC 114 includes a processor 130 having access to memory 132. Memory 132 may be used to store NIC 114 firmware instructions as described below in detail. It is noteworthy that the various aspects of the present disclosure may be implemented using other processing logic including without limitation digital signal processors (DSPs), programmable controllers, application specific integrated circuits (ASICs), programmable logic devices (PLDs), or the like, or a combination of such hardware devices.

NIC 114 includes one or more ports 134 for sending and receiving information from network 116. Port 116 may be coupled to an Ethernet link or any other network link for receiving and transmitting network information (also referred to as frames). Port 116 includes logic and circuitry to receive and send network information complying with one or more protocols.

NIC 114 includes a receive module 136 to temporarily stored information received from the network, while transmit module 138 is used to temporarily store information, before it is transmitted via port 134.

Storage 118 includes a memory controller 150 that stores information at storage blocks 152A-152N. Memory controller 150 may include a processor and a memory for storing instructions (not shown). Memory controller 150 is configured to store information at the storage blocks, retrieve stored information and update messages for NIC 114, as described below in detail.

Figure 1C:
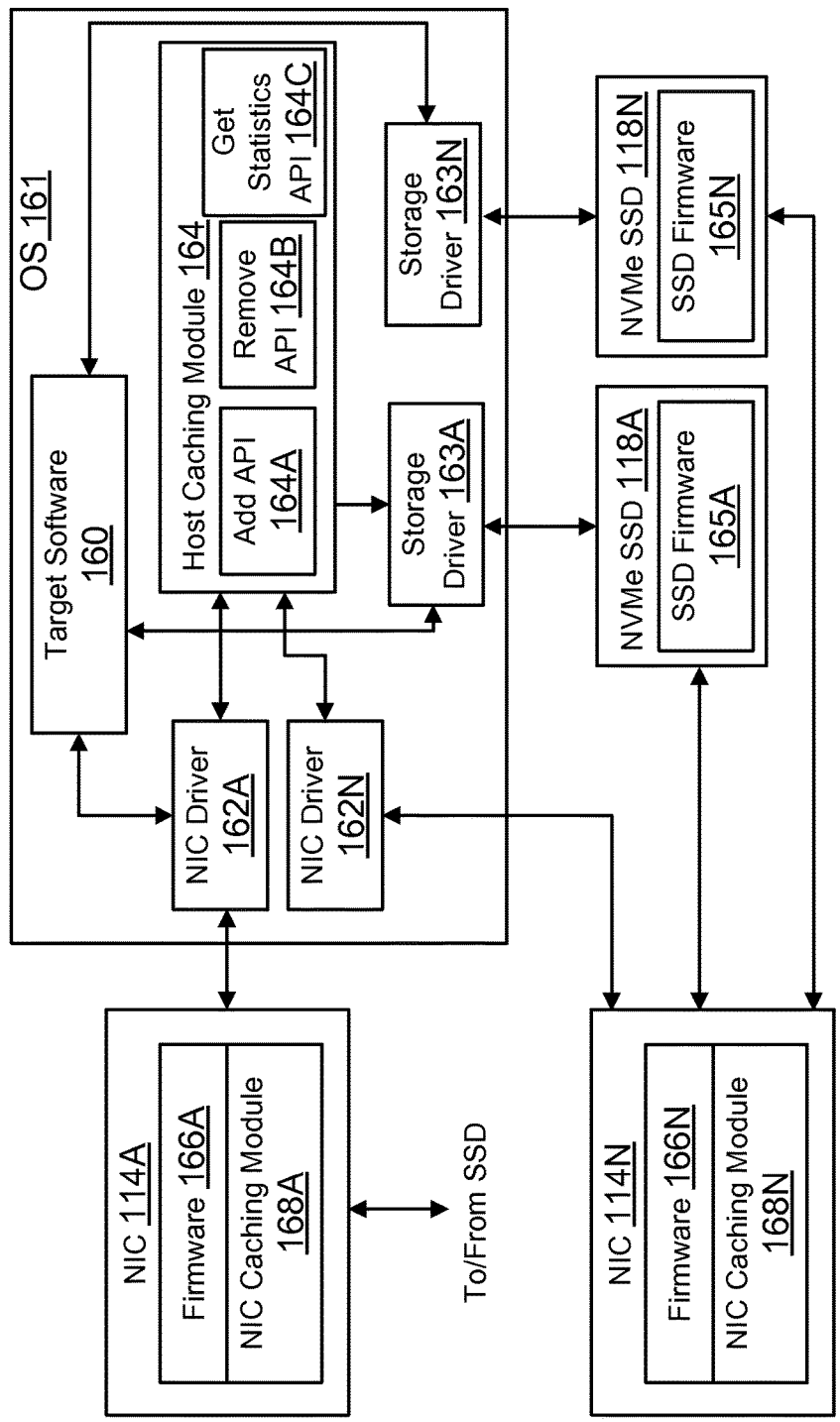
FIG. 1C shows an architectural block diagram used by the system of FIG. 1A, according to one aspect of the present disclosure.

Software Architecture: FIG. 1C shows a high-level block diagram showing the software architecture used according to one aspect of the present disclosure. Although described in terms of software and/or firmware, it is noteworthy that these modules may be implemented in a variety of other ways, including hardware, as described above and understood by those of skilled in the art.

Host system 102A executes an operating system 161, such as, for example and without limitation, Linux based OS, UNIX, iOS, Microsoft® Windows, Android OS, or the like. The operating system 161 manages various applications, such as target software 160. As an example, target software 160 may be an application to generate I/O (input/output) requests to read and write information.

Host system 102A executes NIC drivers 162A and 162B (may be referred to as NIC driver or NIC drivers 162) that may interface with NIC firmware 166A/166N (may be referred to as NIC firmware 166) of NIC 114A/114N, respectively, when applicable. It is noteworthy that although two drivers are shown, the various aspects disclosed herein may be implemented by a single unified driver. Host system 102A also executes storage drivers (may also be referred to as SSD driver when the storage devices are SSDs) 163A/163N (for example, a NVMe driver and maybe referred to as driver 163) that interfaces with the storage device firmware (for example, NVMe firmware) 165A/165N (maybe referred to as SSD firmware 165, when the storage device 118 is a SSD) executed by the NVMe memory controller 150 out of a memory device (not shown) located at storage 118.

As described below in more detail, when a network packet is received by NIC 114, it translates a network storage protocol (for example, iSCSI, FCoE, iSER, NVMf and others) to a storage device protocol, for example, NVMe or AHCI (Advanced Host Controller Interface). AHCI is a technical standard developed by Intel Corp. that specifies the operation of Serial ATA (SATA) host bus adapters. NIC 114 may also perform validation of incoming read and write requests, as described below.

Host system 102A also executes a host caching module 164 that interfaces with NIC driver 162, SSD driver 163 and target software 160 for expediting caching operations. Host caching module 164 includes or interfaces with an Add API (application programing interface) 164A and a Remove (or delete) API 164B that are called to manage an "add" and "remove" process for sync words, described below in detail. NICs 114A/114N also execute a NIC caching module 168A/168N (may be referred to as NIC caching module or NIC caching modules 168) that assist in caching operations, as described below in detail.

In one aspect, a Get Statistics API 164C is provided for obtaining statistics from NIC 114. The statistics may be used by the target software 160 (or any other logic) for developing management policy based on which cache entries/NIC 114 are used for executing some operations and while other operations are not executed using cache entries and instead are executed using a slow-path/mid-path described below. The management policy may be based on the collected statistics and other parameters, for example, service agreements, application type, data type and others.

In one aspect, the host caching module 164 assists in offloading fast path operations to NIC 114. A fast path operation, without limitation, includes a read/write operation that is being cached by the host system 102A, as described below in detail. Other operation types, which may be referred to as slow path and/or mid-path operations may be performed by the host system 102A using driver 162 and other modules. Examples of mid-path/slow-path operations, without limitation, include connection establishment, connection management and others. For most cases, the order in which operations are executed may not be significant. In other instances, for example, SCSI management commands, order of operations may be important. In such a case, offloading may be temporarily suspended until any active command is processed.

Before the details of the caching processes are described, the following describes some of the data structures/queues that are maintained at host memory 106. The various adaptive aspects described herein are of course not limited to these data structures/queues at the host memory 106 since they may be located at other storage locations, including NIC memory 132 and/or storage 118.

Figure 1D:
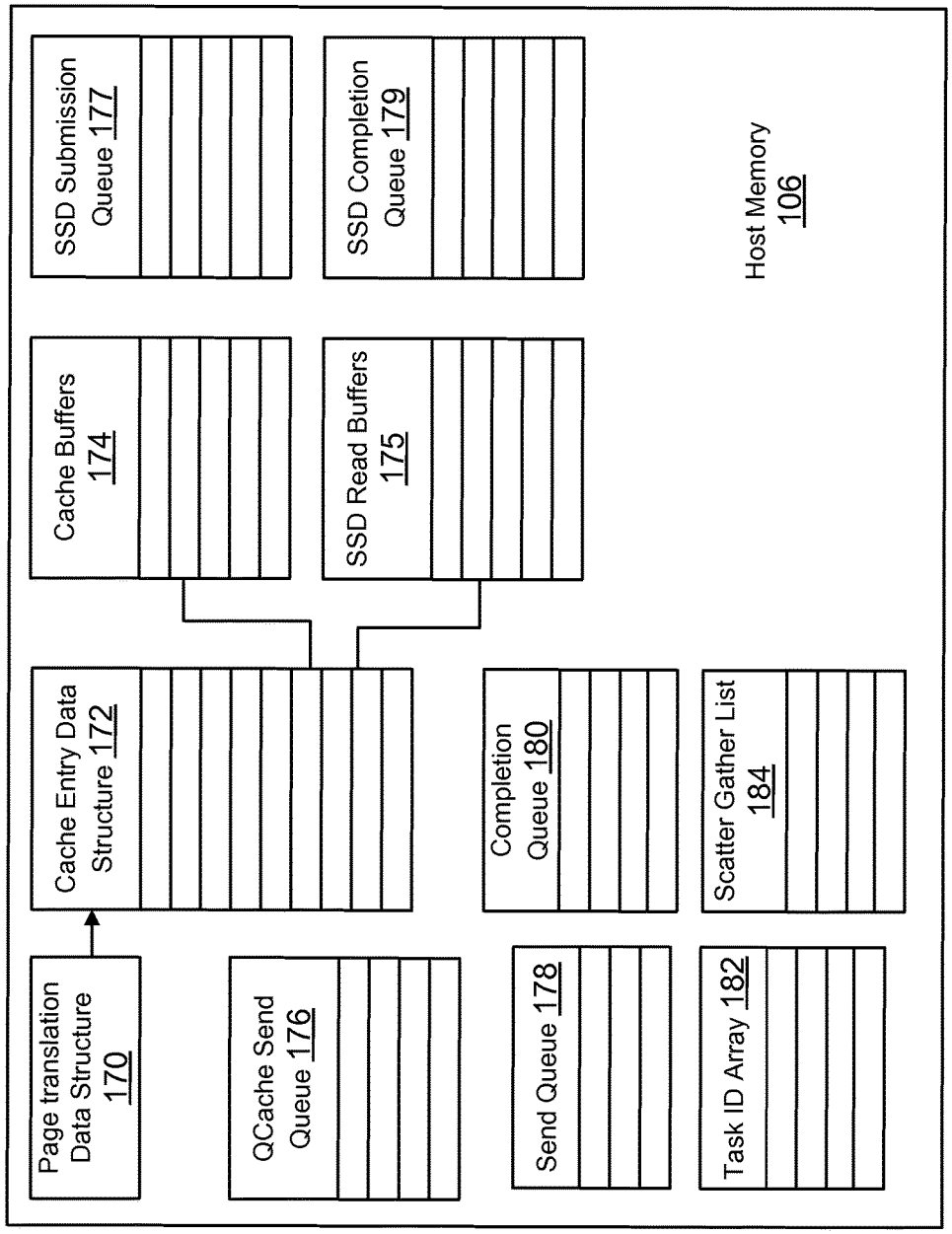
FIG. 1D shows a memory layout, according to one aspect of the present disclosure.

FIG. 1D shows an example of the various data structures and queues that are used by the adaptive processes of the present disclosure. Memory 106 includes a page translation data structure 170 that points to a cache entry data structure (may also be referred to as a hashing data structure) 172 that store various cache entries. It is noteworthy that the various cache entries may reside at a NIC storage location, for example, NIC memory 132. An incoming read request is first translated using the page translation data structure 170 and a logical unit number (LUN) identifier and logical block address (LBA) are used as an index to the cache entry data structure 172. The cache entry data structure 172 stores various cache entries that point to a cache buffer 174 or a SSD read buffer 175 that may include a pool of temporary buffers., when storage 118 is used to cache data. The buffer locations are used to store data and optionally data integrity fields associated with the data. The data from the cache buffer locations 174 and/or SSD read buffer 175 is provided in response to a read request, as described below in detail.

In one aspect, each cache entry at data structure 172 includes a "sync word" described below in detail with respect to FIG. 2, a key that matches the LUN and LBA, a pointer to the location where data and/or integrity data is located, a hit count indicating how many times the entry has been hit and the last time the entry was hit. The hit count and the last time the entry was hit may be provided to the Get Statistics API 164C, based on which the target software 160 may determine which operations to offload/cache for NIC 114 and which are to be executed using the slow-path/mid-path. Details of using the sync word are provided below with respect to FIGS. 2 and 3A-3C. It is noteworthy that data structure 172 may have more than one segment, for example, a first segment may store a hash value that is based on the search key (LUN and LBA) and a second segment may store the sync word, the pointers and the hit counts described above. The adaptive aspects described herein are not limited to how data structure 172 is formatted.

When a read request is received and if there is a cache hit, then the NIC caching module 168 processes the read request as described below with respect to FIG. 4. If there is no cache hit, then the read request is processed by the processor 104, as described below with respect to FIG. 5. When the data is stored at storage 118, then the read request is processed using the process described below with respect to FIG. 6.

When multiple NICs are being used, then the host caching module 164 maintains a plurality of states for each cache entry at data structure 172. The cache entry states and how they are managed are described below in detail.

When NIC 114 is used to process a cache hit, then NIC 114 uses a QCache send queue 176 (maybe referred to as send queue 176) for transmitting data. Completion queue 180 is used to post completion of read and other operations. It is noteworthy that the add API 164A and the remove API 164B may be used to selectively populate cache entries for read and write operations. Target software 160 or any other processing logic may use statistics obtained by the Get Statistics API 164C to selectively use the cache and the cache entries for processing I/O requests. The send queue 178 is used for processing read requests, when there is no cache hit i.e. there is no matching cache entry, which means that host memory 106 or storage 118 is not used to cache data. In one aspect, when there is a cache miss, then the NIC driver 162 generates the scatter gather list 184 and posts a request at the send queue 178. The NIC retrieves the data and then prepares a network packet for transmission. The task identifier array 182 is used for managing task identifiers for read requests, as described below in detail.

Memory 106 also includes a SSD submission queue 177 where a request is placed for storage 118, when data is stored at storage 118. Data received from the storage 118 is stored at data buffer locations 175. Once data is moved from the storage 118, a completion is posted at the completion queue 179. In one aspect, the request for data is submitted by NIC 114, while the completion queue 179 is updated by the memory controller 150 of storage 118.

To communicate with storage 118, NIC 114 generates a doorbell message. This may be enabled by using a MSI-X (Message Signaled Interrupts) defined by the PCI-Express specification. An interrupt message is written to a PCI-Express address of the storage 118 that generates a doorbell message for an assigned submission queue 177. The message data includes a submission queue tail or the message triggers reading of the submission queue tail. As an example, interrupts/doorbell messages may be aggregated because the difference between a last sequential write and a current sequential write indicates a number of commands that may have been added to the submission queue.

When any command is completed by the storage device 118, it generates a doorbell message for the NIC 114. This may be enabled by modifying the MSI-X interrupt where an interrupt message is written to a PCIe address for the NIC 114. The message includes a completion tail queue or triggers a reading of the completion queue tail.

In one aspect, SSD submission queue 177, SSD completion queue 179 and host memory data buffers may be mapped to a NIC address space instead of a host memory to improve performance. In another aspect, the mapping is based on an address space for the storage device.

It is noteworthy that although the various queues and examples described herein are based on SSD devices for convenience, the adaptive aspects described herein may be implemented for any storage device type. Furthermore, although the various buffers/queues of FIG. 1D are described with respect to memory 106, the adaptive aspects described herein are not limited to any particular location and the buffers/queues may be located at NIC memory 132 or any other location.

Figures 2, 3A:
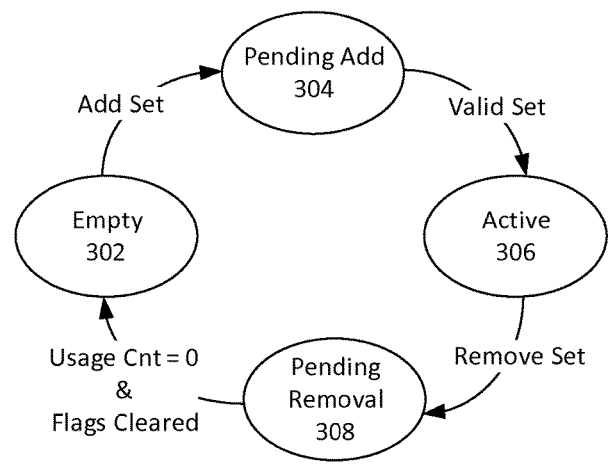
FIG. 2 shows an example of a sync word for managing cache entries, according to one aspect of the present disclosure.
FIG. 3A shows a hardware executable state diagram for managing sync word states, according to one aspect of the present disclosure.

FIG. 2 shows an example of a sync word 200 with various states of a cache entry that may be stored at data structure 172, according to one aspect. It is noteworthy that the term state also indicates the role of an entry to ensure that an entry is not removed while there may be a pending task associated with the entry and ensures that a free entry is not filled concurrently by two processors (or processing logic). The sync word may be used to synchronize use of a cache entry by multiple components including NIC caching modules 168 and host caching module 164. Each sync word may "Add, Remove or Valid" as states/roles. The use of these states/roles is described below in detail.

In one aspect, the entry states are used to track active items in order to avoid changes while an item is being used. The active items may be items that are currently being used by the NIC to service requests. This is implemented by a usage counter, described below in detail.

In another aspect, the entry states are used to prevent race conditions. For example, a race between different host controllers/processing logic when trying to update an empty unused sync word; a race between the read of the sync word to increment/decrement the usage counter; and race between host removal process and NIC usage, which may be enabled by using a combination of atomic operations, flags, or unique identifiers, as described below in detail. The race conditions described herein are examples of the various adaptive aspects of the present disclosure.

Sync word 200 includes an identifier 204 (shown as ID) that identifies the cache entry. Field 206 is reserved. As mentioned above, a cache entry may have multiple states indicated by bit settings add 208, remove 210 and valid 212. The use of these various states and bit settings is described below in detail. A usage counter 216 is used to track a task that is assigned to an entry. For example, when the usage count is zero, then it means the entry is not being used. If the usage count is 1 (or more) then it means that there is a task or multiple tasks that are using the entry. NIC 166 increments the usage counter 216 when a task is assigned and decrements the usage counter every time the task is completed. The use of usage counter 216 may also be reported by NIC firmware 166 using the Get Statistics API 164C, described above in detail.

Sync word 200 also stores an overflow error indicator 214 and an underflow error indicator 202. The overflow error indicator is generated when there are too many tasks that need to be performed. The underflow error may be generated when a task was completed when a usage counter 216 was zero.

In one aspect NIC firmware 166 uses atomic operations (e.g. atomic increment/decrement/"comp swap") for the sync word. As an example, new tasks are assigned to a cache entry when the valid bit is set (for example, 1), overflow and underflow bits are not set (or have a value of 0) and the remove bit is also not set. When the usage counter is increased, the atomic operation returned identifier is verified with ID 204.

FIG. 3A shows a state machine diagram 300 showing state transitions for the various sync word states (for example, Empty 302, Pending Add 304, Active 306 and Pending Removal 308) for a cache entry, according to one aspect. Multiple processor cores (for example, 104A, 104B, NICs and other processing logic) may use an Add API to write to the same memory location. If multiple processor cores attempt to do that then they will not be able to ascertain which core may have locked the entry. As described below, using an atomic operation of compare swap enables sync between multiple cores. The atomic operation instructs the memory system to read a value, compare it to a given value and only write if it is equal, to write a new value.

At an initialization state, all sync words are zero, shown as Empty 302. When a task is assigned to the entry, the Add API 164A is called that initiates an Empty (302), Pending Add (304) to Active 306 state transitions. During this transition, the add bit 206 and the valid bit 212 are set. The Remove API 164B is called when a cache entry needs to be invalidated or space associated with the entry has to be freed. This enables the state transition from Active to Pending Remove 308 state when the remove bit 210 is set. Thereafter, the usage count is decreased to zero and the flags are cleared for the transition to the Empty state 302. In one aspect, the usage counter is increased by the NIC, when the entry is in an Active state. The usage counter may be decreased while the entry is in the Pending Remove state. In one aspect, the usage counter may be decreased by the host processor when there is a timeout error while the host processor was waiting for the usage counter to decrease to zero.

Figure 3B:
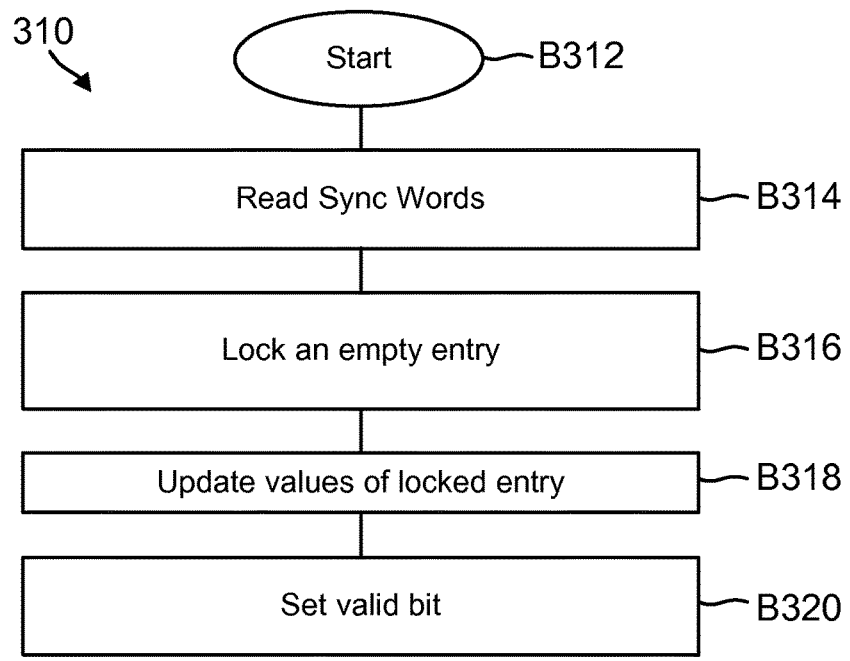
FIG. 3B shows a process for executing an Add process for a cache entry using a sync word, according to one aspect of the present disclosure.

FIG. 3B shows an example 310 for transitioning to Pending Add 302 state triggered by the Add API 164A, according to one aspect of the present disclosure. The process begins in block B312, when the host caching module 164 is initialized and operational. In block B314, the host caching module 164 (using the Add API 164A) reads all the sync words within a search window. An empty entry is locked in block B316 by setting the add bit 208. In one aspect, this is implemented by an atomic compare-swap operation. As explained above, using the atomic compare swap operation enables sync between multiple processor cores that attempt to access the memory. In block B318, the values of the locked cache entry are updated. In one aspect, the host processor (104A, 104B) can initialize the various values of the cache entry, including a pointer to the cached data, entry hit count, and the last entry hit time and others. In block B320, the valid bit 212 is set for the entry. In one aspect, this does not require any special operation because the entry is locked by the add bit 208.

Figure 3C:
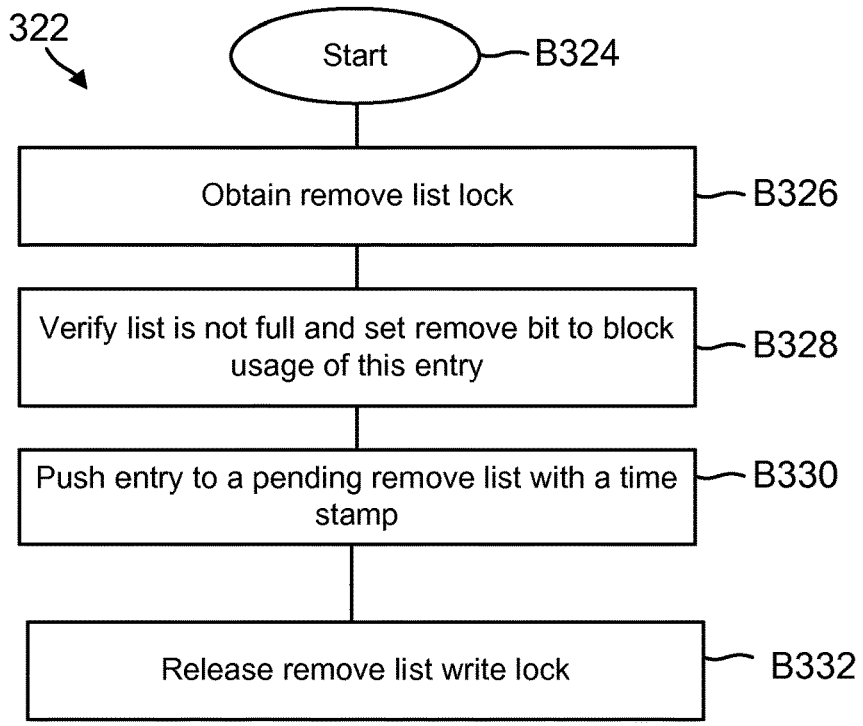
FIG. 3C shows a process for executing a Remove process for a cache entry using a sync word, according to one aspect of the present disclosure.

FIG. 3C shows an example 322 for transitioning to the Pending Removal state 308 triggered by the Remove API 164B, according to one aspect of the present disclosure. The process begins in block B324, when the host system 102 and the NICs 114 are operational.

In block B326, a remove list write lock is obtained. The list includes a list of entries that need to be removed. In one aspect, the list is generated and maintained by the Remove API 164B. In block B328, the process verifies to make sure that the list is not full. As an example, the remove list may be full when the list is smaller in size and the remove process may be taking a longer duration. Then the remove bit 210 is set to block usage of the entry that is being removed. The bit is set atomically rather than by using "read-modify-write" so as not to generate an error based the usage counter 216. In block B330, the entry is pushed to the remove list that includes entries that need to be removed. The entry is pushed with a time stamp. Thereafter, in block B332, the remove list write lock is released. This ensures that another entry can be added to the remove list. The process then ends.

Figure 4:
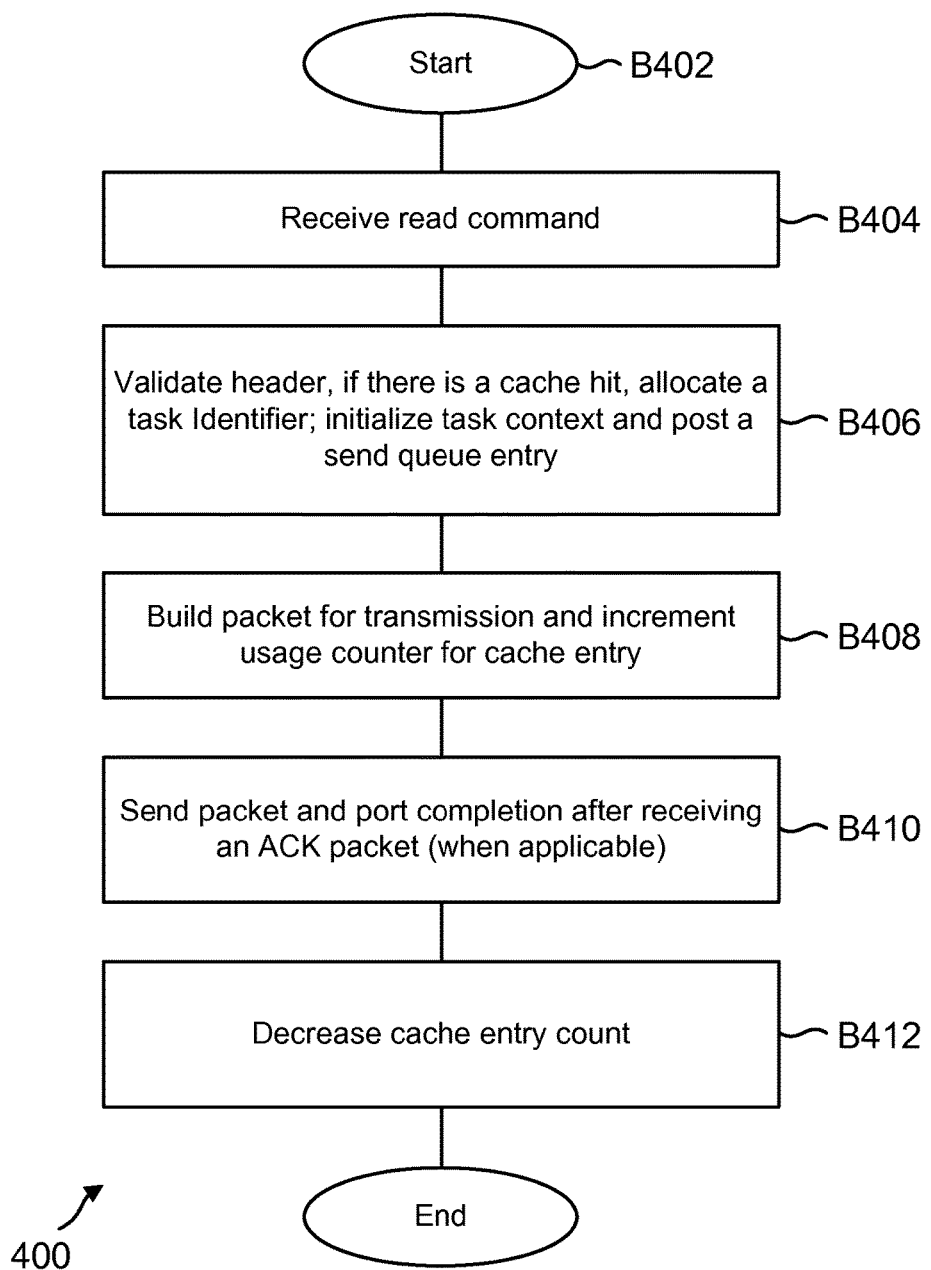
FIGS. 4 and 5 show process flow diagrams for processing read requests when there is a "cache hit or a "cache miss", according to one aspect of the present disclosure.

FIG. 4 shows a process 400 for executing a read command, when there is a cache hit, which means that a read request can be processed by NIC 114, according to one aspect of the present disclosure. The process begins in block B402, when both host system 102 and NIC 114 are operational. In block 404, a read request is received by NIC 114. The NIC 114 validates the header and determines if there is cache hit by checking the cache entry data structure 172. When there is a cache hit, NIC 114 allocates a task identifier using the task identifier array 182 for the read request. A task context is then initiated, the usage counter is atomically incremented, and the request is posted at QCache send queue 176. In block B408, NIC 114 obtains the request for transmit processing. NIC 114 generates data packets (for example, protocol data units (PDUs) for transmission. NIC 114 may also perform the TCP processing (or any other transport protocol as applicable). In block B410, the requested packet is then sent to the destination via the network. It is noteworthy that NIC 114 manages the read operation when there is a cache hit. Once the destination receives the packet, it may send an acknowledgement (ACK) packet, when applicable. Once the ACK packet is received, the task identifier entry is cleared by the NIC firmware and in block B412, the usage counter 216 is atomically decremented. The Get Statistics API 164C may then be used to report statistics to, for example, target software 160. It is noteworthy that the Get Statistics API 164C may be used at any time to obtain statistics for the target software 160 or any other module. Thereafter, the process ends.

Figure 5:
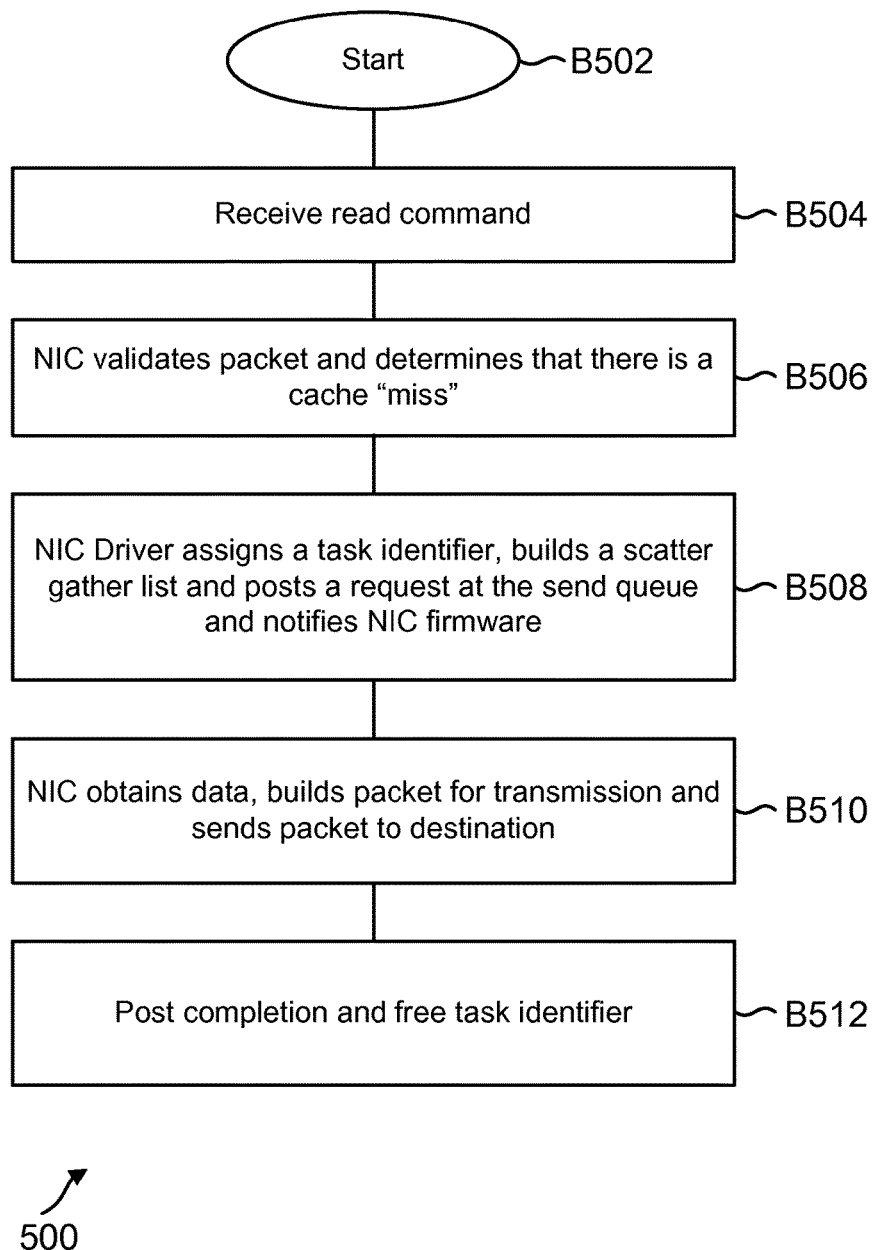

FIG. 5 shows a process 500 for processing a read request, when there is no cache hit i.e. when the requested data is not located at memory 106. The process begins in block B502, when the host system and NIC 114 are all operational. In block B504, a read request is received by NIC 114. In block B506, the NIC 114 validates the packet, performs the TCP protocol processing (or any other transport protocol as applicable) and determines that the requested data is not available at the cache by consulting cache entry data structure 172. NIC driver 162 is then notified. In block B508, optionally, NIC driver 116 assigns a task identifier using array 182, builds a scatter gather list 184 and then posts a request at the send queue 178. The NIC 114 is also notified.

In block B510, NIC 114 obtains the data based on the SGL 184 and builds the packets for transmission. The packet is sent to its destination. Once an ACK is received from the destination (when applicable), a completion is posted at completion queue 180. Thereafter, the task identifier for the completed read request is freed and can be re-used.

Figure 6:
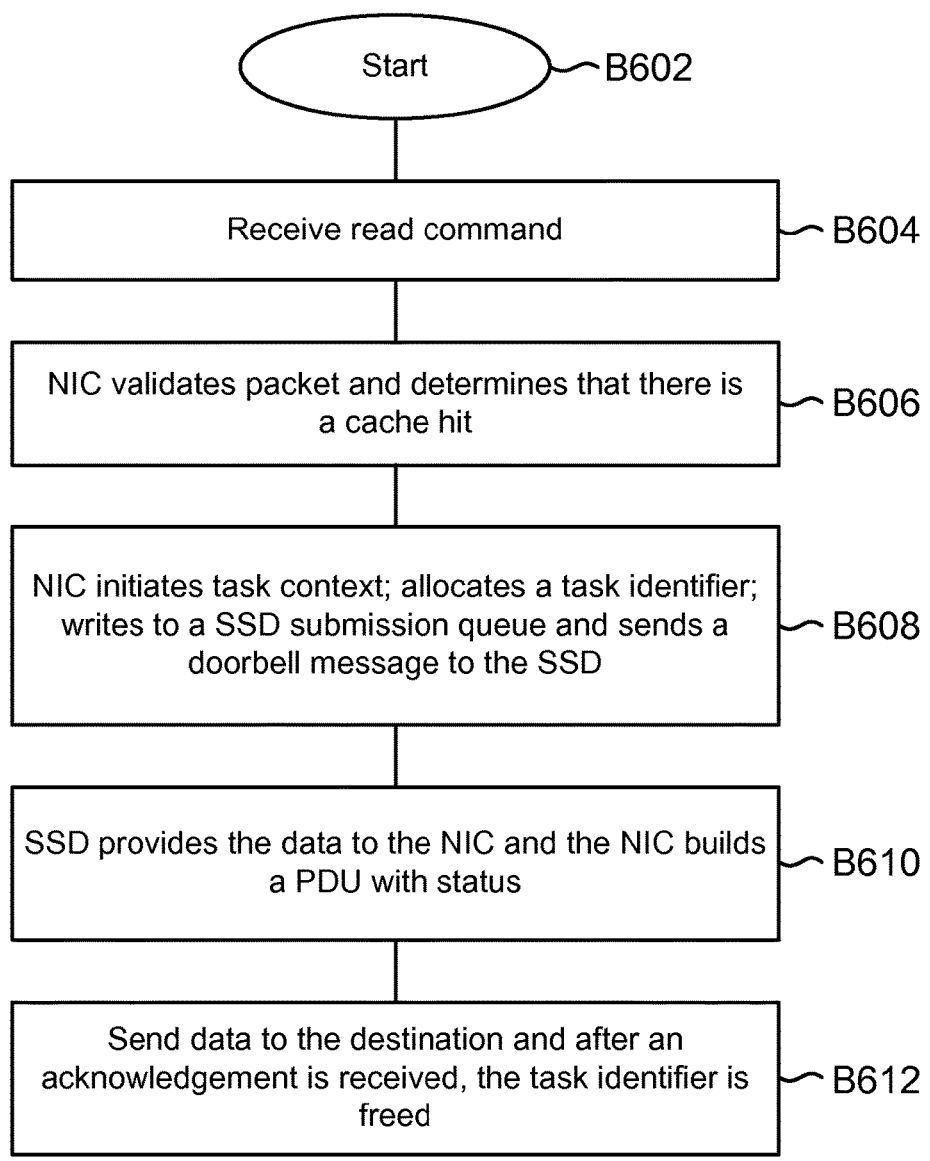
FIG. 6 shows a read process flow when a solid state storage device is used to cache the data, according to one aspect of the present disclosure.

FIG. 6 shows a fast path read process 600 when data is cached at storage 118, according to one aspect of the present disclosure. The process begins in block B602, when the host system 102, NICs 114 and storage 118 are operational and initialized. In block 604, a read request is received by NIC 114. In block B606, the NIC 114 validates the header and determines if there is a cache hit. When there is a cache hit, in block B608, the NIC 114 allocates a task identifier for the read request and initializes a task context. The NIC 114 firmware then writes to the SSD submission queue 177 and sends a doorbell message for storage 118. In block B610, the storage 118 obtains the data and places the data at the read buffers 175. The storage 118 sends a doorbell message to the NIC 114. In block B612, the NIC 114 obtains the data from read buffers 175, prepares the network packet and sends the network packet to its destination. Thereafter, the task identifier at array 182 is freed so that it can be used again.

In one aspect, the process flows described above may be used with different networking protocols and technologies, for example, iSCSI, Fibre Channel, FCoE, iSER (iSCSI Extensions for RDMA), NVMf (NVME over fabrics) and others. (In one aspect, NIC caching module 168 is used to offload the processing of a read operation from the host processor 104. This result is a higher throughput, lower latency, better utilization of processor 104 and reduced power, as described above in detail. In another aspect, by managing the cache entries, N number of NICs may use the same cache for processing read requests.

In another aspect, a machine implemented method is provided. The method includes maintaining a cache entry data structure for storing a sync word associated with a cache entry that points to a storage location at a host memory or a storage device external to the host memory; where the sync word is associated with a plurality of states that are used by a NIC and a caching module of a computing device coupled to the NIC for processing input/output requests; using the cache entry data structure by the NIC to determine that there is a cache hit, in response to a read request received by the NIC; retrieving data from the host memory by the NIC, when data for the read request is stored at the host memory location; communicating by the NIC with the storage device to retrieve data for the read request, when the data is cached at the storage device; and placing the data for the read request for the NIC by the storage device at the host memory, when the data is cached by the storage device.

In yet another aspect a computing device having a host memory and a host processor for executing instructions out of the host memory; and a NIC interfacing with the computing device is provided. As described above in detail, when there is a cache hit for a read request, the network interface card processes the read request by obtaining data stored from one or both of the host memory and a storage device that the network interface card accesses without involving the host processor and when there are is a cache miss, then the read request is processed by the host processor.

Although the present disclosure has been described with reference to specific aspects, these aspects are illustrative only and not limiting. For example, although the description above has been described with respect to a NIC, any other device may be configured to perform the foregoing function. Thus the term NIC, adapter and device are interchangeable. Many other applications and aspects of the present disclosure will be apparent in light of this disclosure and the following claims. References throughout this specification to "one aspect" or "an aspect" means that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

What is claimed is:

1. A machine implemented method, comprising:
maintaining a cache entry data structure for storing a sync word associated with a cache entry that points to a storage location at a storage device accessible to a network interface card (NIC) via a peripheral link, the peripheral link couples the NIC, the storage device and a processor of a computing device; wherein the sync word is associated with a plurality of states that are used by the NIC and a caching module executed by the processor of the computing device for processing requests to transmit data cached at the storage device by the NIC using a network link; wherein the plurality of states are an add state, a remove state and a valid state that are updated by the NIC by setting bits associated with each of the plurality of states;

using the cache entry data structure by the NIC to determine that there is a cache hit indicating that data for a read request is cached at the storage device;

posting a first message for the storage device by the NIC via the peripheral link, at a storage device queue located at a host memory of the computing device, the message requesting the data for the read request from the storage device;

in response to the first message, placing the data for the read request for the NIC by the storage device at the host memory via the peripheral link;

posting a second message for the NIC by the storage device at the host memory via the peripheral link for notifying the NIC that the data for the read request has been placed at the host memory;

retrieving the data placed by the storage device at the host memory by the NIC via the peripheral link;

transmitting the data for the read request by the NIC to via the network link; and updating by the NIC, a state of a cache entry associated with the read request at the cache entry data structure.

2. The method of claim 1, wherein the cache entry for the read request is locked by an atomic operation that sets an add bit of the sync word.

3. The method of claim 2, wherein after the add bit is set, a valid bit of the sync word is set indicating that the cache entry for the read request is locked for use.

4. The method of claim 2, wherein a remove bit of the sync word is set after an associated task for the cache entry for the read request is completed.

5. The method of claim 1, wherein the sync word includes a usage counter that is increased when a task is assigned to the cache entry for the read request and decreased when the task is completed.

6. The method of claim 1, wherein the sync word includes an overflow bit which is set when the cache entry for the read request is being used by a plurality of tasks.

7. A non-transitory, machine readable storage medium having stored thereon instructions for performing a method, comprising machine executable code which when executed by at least one machine, causes the machine to:

maintain a cache entry data structure for storing a sync word associated with a cache entry that points to a storage location at a storage device accessible to a network interface card (NIC) via a peripheral link, the peripheral link couples the NIC, the storage device and a processor of a computing device; wherein the sync word is associated with a plurality of states that are used by the NIC and a caching module executed by the processor of the computing device for processing requests to transmit data cached at the storage device by the NIC using a network link; wherein the plurality of states are an add state, a remove state and a valid state that are updated by the NIC by setting bits associated with each of the plurality of states;

use the cache entry data structure by the NIC to determine that there is a cache hit indicating that data for a read request is cached at the storage device;

post a first message for the storage device by the NIC via the peripheral link, at a storage device queue located at a host memory of the computing device, the message requesting the data for the read request from the storage device;

in response to the first message, place the data for the read request for the NIC by the storage device at the host memory via the peripheral link;

post a second message for the NIC by the storage device at the host memory via the peripheral link for notifying the NIC that the data for the read request has been placed at the host memory;

retrieve the data placed by the storage device at the host memory by the NIC via the peripheral link;

transmit the data for the read request a destination via the network link; and updating by the NIC, a state of a cache entry associated with the read request at the cache entry data structure.

8. The storage medium of claim 7, wherein the cache entry for the read request is locked by an atomic operation that sets an add bit of the sync word.

9. The storage medium of claim 8, wherein after the add bit is set, a valid bit of the sync word is set indicating that the cache entry for the read request is locked for use.

10. The storage medium of claim 8, wherein a remove bit of the sync word is set after an associated task for the cache entry for the read request is completed.

11. The storage medium of claim 7, wherein the sync word includes a usage counter that is increased when a task is assigned to the cache entry for the read request and decreased when the task is completed.

12. The storage medium of claim 7, wherein the sync word includes an overflow bit which is set when the cache entry for the read request is being used by a plurality of tasks.

13. A system, comprising:

a computing device having a host memory, a storage device, and a host processor for executing instructions out of the host memory; and a network interface card interfacing with the computing device and the storage device via a peripheral link, wherein when there is a cache hit for a read request to transmit data by the network interface card to a destination, the network interface card posts a first message for the storage device via the peripheral link at a storage device queue at the host memory requesting data for the read request, in response to the first message, the storage device places the data at the host memory via the peripheral link and the storage device posts a second message for the network interface card via the peripheral link, notifying the network interface card that data has been placed; and wherein, in response to the second message, the network interface card retrieves the data from the host memory via the peripheral link; updates a state of a cache entry associated with the read request at a cache entry data structure and transmits the data to the destination; wherein the state is from a plurality of states that include an add state, a remove state and a valid state that are updated by the NIC by setting bits associated with each of the plurality of states; and when there are is a cache miss indicating that the data is not located at the storage device, then the read request to transmit the data to the destination is first processed by the host processor by updating a scatter gather list indicating a location of the data, the network interface card retrieves the data using the scatter gather list and then the data is transmitted by the network interface card to its destination.

14. The system of claim 13, wherein a driver executed by the host processor performs an operation that is not offloaded to the network interface card.

15. The system of claim 13, wherein an application programming interface obtains statistics from the network interface card that is used for selecting operations that are offloaded to the network interface card and operations that are not offloaded to the network interface card.

16. The system of claim 15, wherein the cache entry data structure is selectively populated by an application programming interface to offload an operation to the network interface card and any operation that is not offloaded to the network interface is executed by the computing device.

17. The system of claim 13, wherein the cache entry data structure is maintained for storing a sync word associated with the cache entry that points to a storage location at the storage device where the data is stored.

18. The system of claim 17, wherein the sync word includes a usage counter that is increased when a task is assigned to the cache entry and decreased when the task is completed.

* * * * *